Nov. 9, 1965        J. G. TYHURST        3,216,876
METHOD OF CONTINUOUSLY MAKING FIBER REINFORCED LAMINATED PIPE
Filed Feb. 6, 1962        3 Sheets-Sheet 1
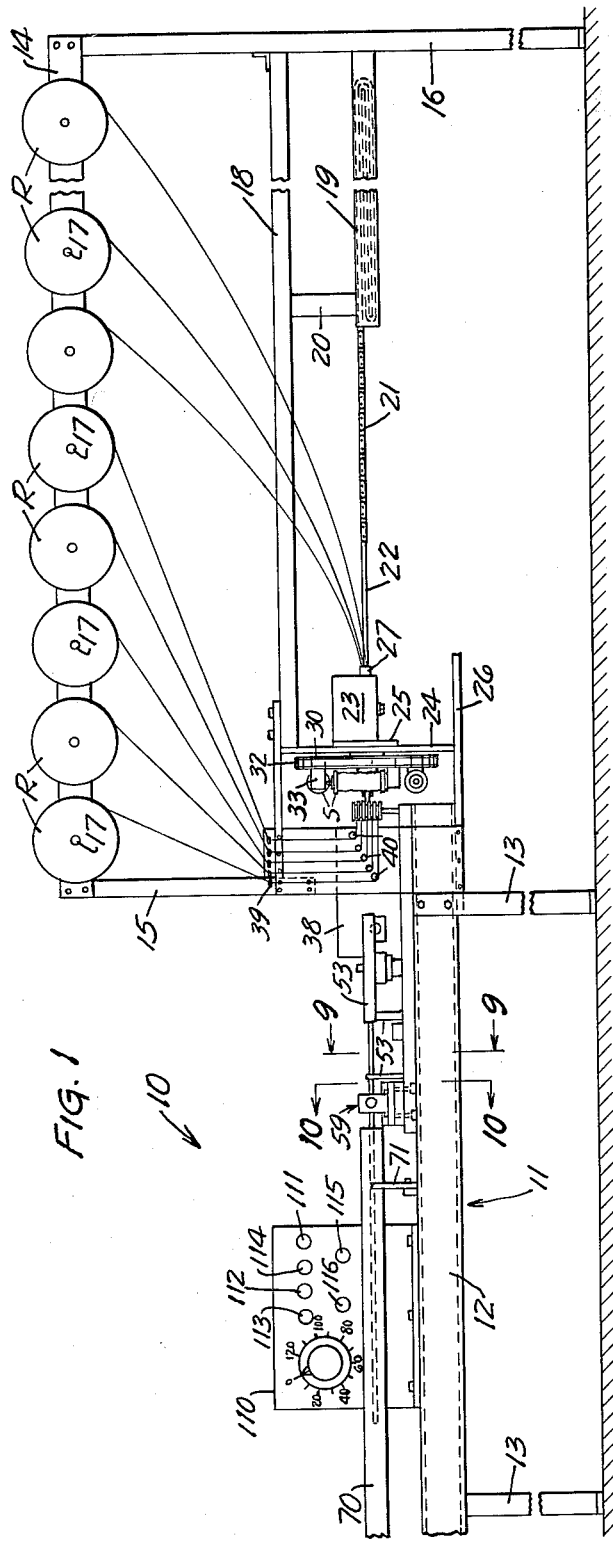
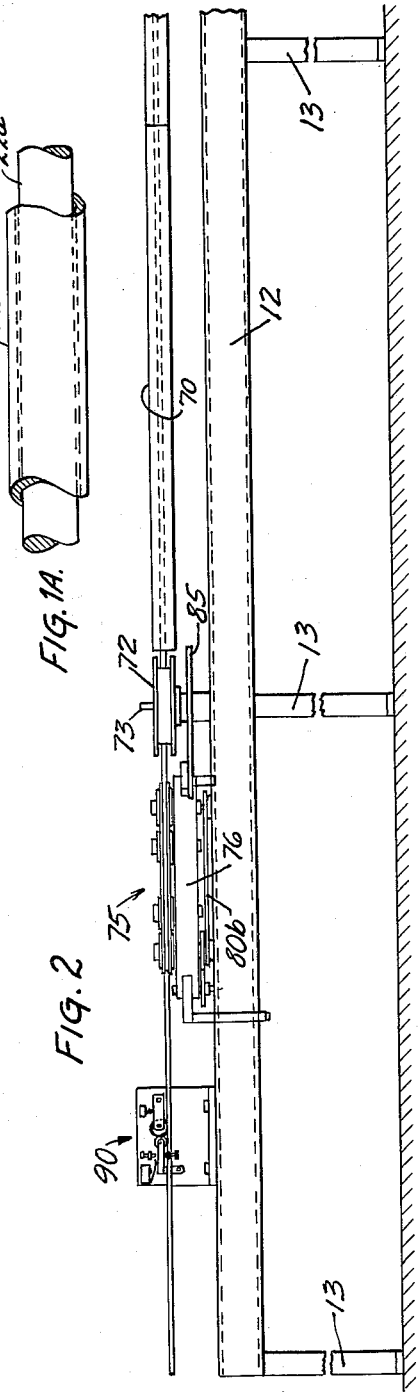
INVENTOR
JAMES G. TYHURST
BY
Williamson & Palmatier
ATTORNEYS

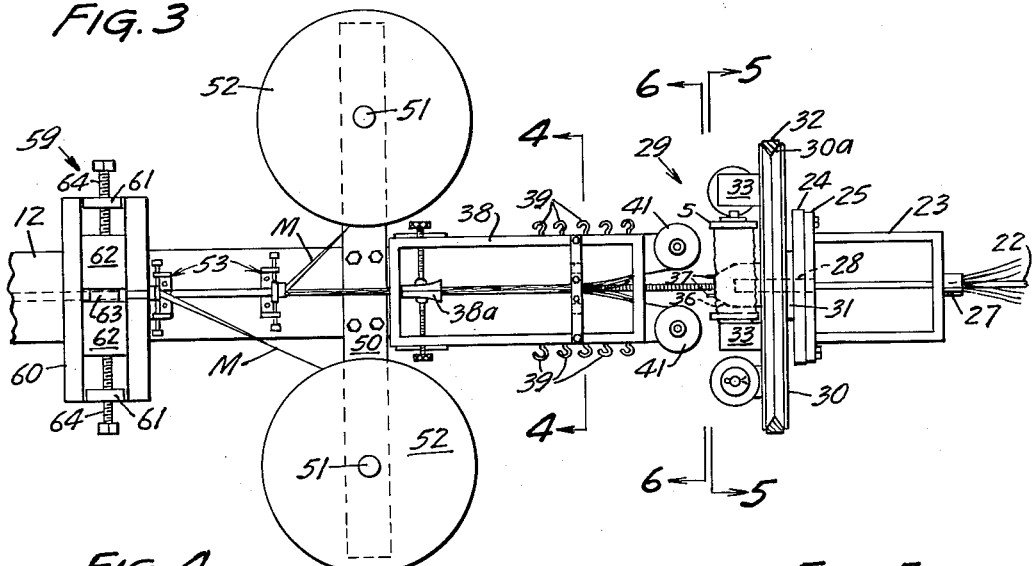
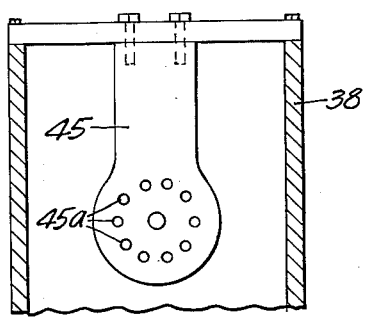
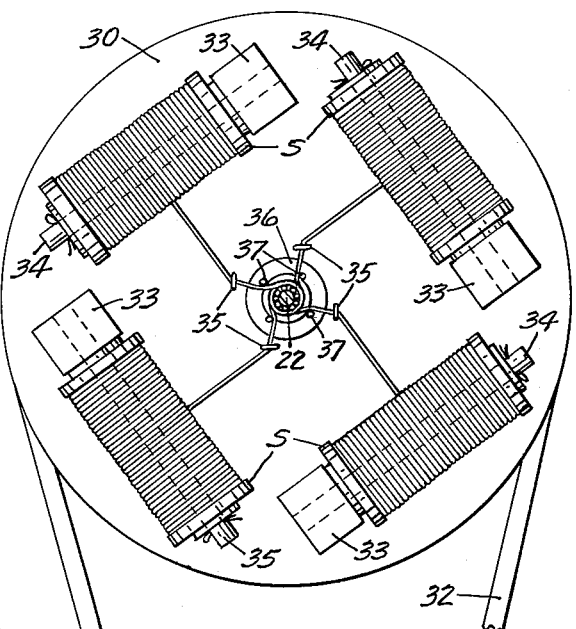
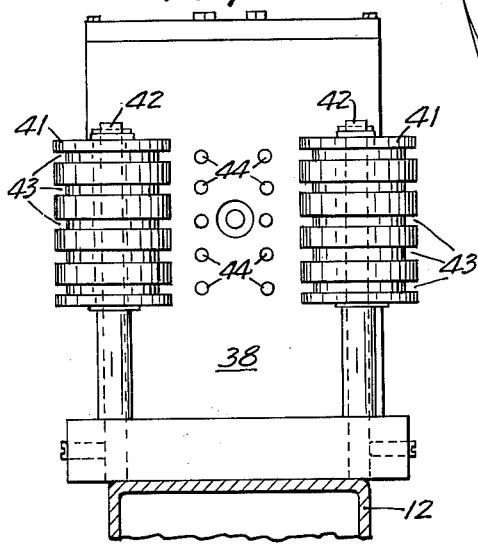

Nov. 9, 1965　　　　J. G. TYHURST　　　　3,216,876
METHOD OF CONTINUOUSLY MAKING FIBER REINFORCED LAMINATED PIPE
Filed Feb. 6, 1962　　　　　　　　　　　　3 Sheets-Sheet 3
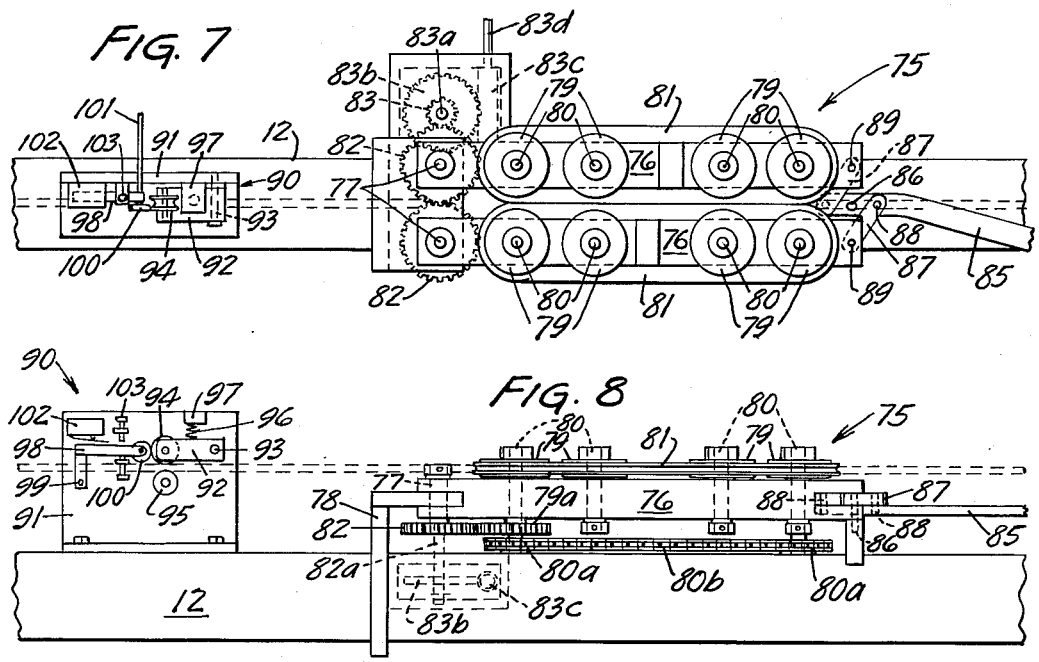
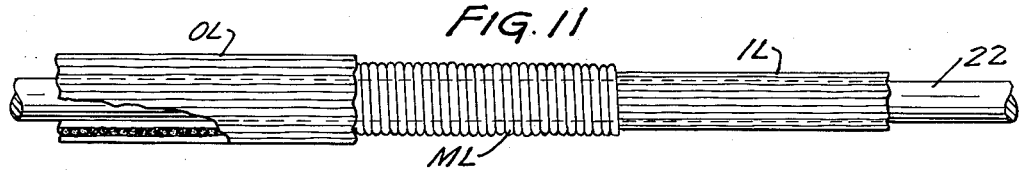
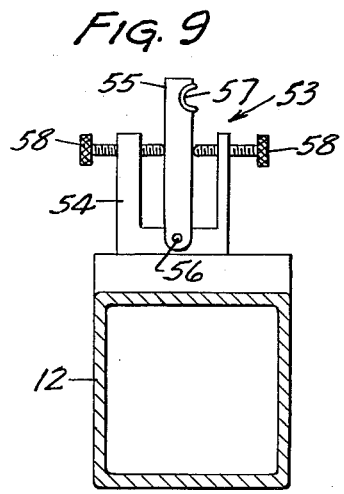
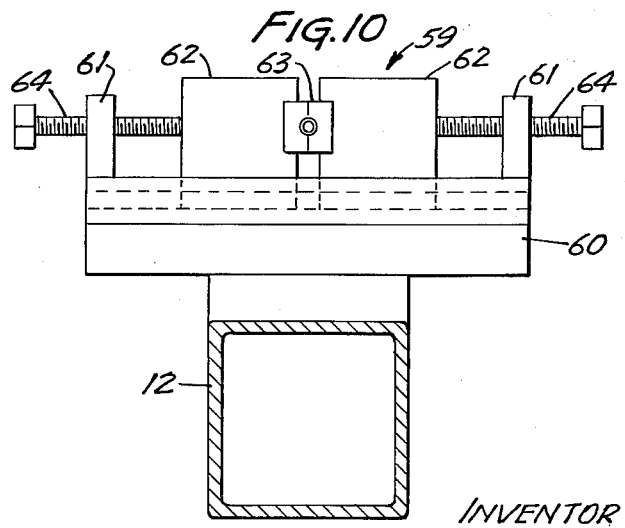
INVENTOR
JAMES G. TYHURST
BY Williamson & Palmatier
ATTORNEYS

United States Patent Office 3,216,876
Patented Nov. 9, 1965

3,216,876
METHOD OF CONTINUOUSLY MAKING FIBER REINFORCED LAMINATED PIPE
James G. Tyhurst, Minneapolis, Minn., assignor to Polystructures, Incorporated, Minneapolis, Minn., a corporation of Minnesota
Filed Feb. 6, 1962, Ser. No. 171,382
1 Claim. (Cl. 156—173)

This invention relates to high capacity process and apparatus for making fiber-reinforced plastic pipe structures.

One of the objects of this invention is to provide a very high capacity process and apparatus for forming and economically producing fiber-reinforced plastic laminated pipe structures.

Another object of this invention is the provision of a process and apparatus of great commercial capacity which may be utilized for substantially continuous line production and wherein sets of resin-coated fibers are positioned upon a stationary heated cylindrical support and arranged thereon into a laminated tubular structure, the fibers of each lamina being oriented either axially or helically with respect to the support and wherein the tubular laminated structure is moved axially along the heated cylindrical support at a predetermined speed until the resin of the innermost lamina is at least partially cured and thereby dimensionally stable.

A further object of this invention is the provision of a novel process and apparatus for continuously forming fiber-reinforced plastic laminated pipe structure in which sets of elongate fibers are coated with a liquid, preferably thermosetting resin, and are disposed upon a heat cylindrical, stationary support and moved axially therealong to form a laminated tubular structure, the fibers of the innermost lamina being oriented axially with respect to the support while the fibers of the next adjacent lamina are arranged helically, and wherein the axially moving laminated tubular structure is simultaneously heated exteriorly as well as interiorly to effect rapid curing of the resin.

These and other objects and advantages of my invention will more fully appear from the following description made in connection with the accompanying drawings wherein like character references refer to the same or similar parts throughout the various views, and in which:

FIG. 1 is a side elevational view of one portion of the apparatus comprising the present invention and including substantially the rear half of the apparatus;

FIG. 1a is a fragmentary view of the mandrel, cut away to show the heating element therein.

FIG. 2 is a side elevational view of the remaining portion of the apparatus and including substantially the forward portion of the apparatus;

FIG. 3 is a detailed plan view on an enlarged scale of a part of the apparatus illustrated in FIG. 1;

FIG. 4 is a cross sectional view on an enlarged scale taken approximately along line 4—4 of FIG. 3 and looking in the direction of the arrows;

FIG. 5 is a cross sectional view on an enlarged scale taken approximately along line 5—5 of FIG. 3 and looking in the direction of the arrows;

FIG. 6 is a cross sectional view on an enlarged scale taken approximately along line 6—6 of FIG. 3 and looking in the direction of the arrows;

FIG. 7 is a detailed plan view of a part of the apparatus illustrated in FIG. 2;

FIG. 8 is a side elevational view of that part of the apparatus illustrated in FIG. 7;

FIG. 9 is a cross sectional view on an enlarged scale taken approximately along line 9—9 of FIG. 1 and looking in the direction of the arrows;

FIG. 10 is a vertical cross sectional view on an enlarged scale taken approximately along line 10—10 of FIG. 1 and looking in the direction of the arrows; and FIG. 11 is an enlarged detailed fragmentary view of the laminated fiber-reinforced pipe structure formed on the cylindrical support and indicating the orientation of the fibers of each respective lamina with respect to the cylindrical support.

The present invention is directed to a continuous process and apparatus for forming laminated, fiber-reinforced plastic pipe structures. Each lamina of the laminated pipe structure thus formed is constructed of resin coated fibers wherein the fibers of each lamina are either axially or helically oriented with respect to the support upon which the pipe structure is formed. With this type of construction, there is no inter-weaving of the fibers within each lamina or between respective lamina and this type of construction produces high strength physical characteristics.

It is also pointed out that in the fiber-reinforced plastic pipe structures comprising the prior art, the fibers of these pipe structures are inter-woven so that when these pipe structures are subjected to tension or compression stresses, a scissoring action occurs between the inter-woven fibers thus causing failure of the pipe structure.

In carrying out the process comprising the present invention, a plurality of fibers are coated with a liquid plastic resin, preferably a thermosetting resin, and are disposed in axially extending relation upon a stationary support to define an inner lamina. A second set of fibers are helically wound upon the inner lamina to define a second lamina, the fibers of which are helically disposed with respect to the fibers of the inner lamina. A third set of resin-coated fibers is axially arranged upon the second or intermediate lamina and defines an outer lamina.

As this laminated pipe structure is being formed upon the stationary support, the laminated pipe structure will be moved axially along and from the heated cylindrical support. The heating of this support causes at least partial curing of the resin of the innermost lamina so that this innermost lamina is dimensionally stable. The axially moving tubular pipe structures also passes through a heating zone to cause very rapid curing of the laminated structure thus permitting rapid production of the pipe.

Referring now to the drawings, it will be seen that one embodiment of the apparatus for carrying out my novel process for producing laminated, fiber-reinforced pipe is thereshown. It will be seen that this apparatus, designated generally by the reference numeral 10, as best seen in FIGS. 1 and 2, is comprised of an elongate supporting frame structure 11 and includes an elongate frame member 12 which is of substantially rectangular cross-sectional configuration. It will be seen that this elongate frame 12 is substantially horizontally disposed and is supported upon a supporting surface in spaced relation thereabove by a plurality of legs 13 which are affixed to the frame member 12 and depend therefrom.

Mounted rearwardly of and above the elongate frame member 12, as best seen in FIG. 1, is an elongate upper frame member 14. This frame structure 14 is supported at its front end by a vertically disposed support element 15 and is supported at its rearmost end by a vertically disposed support element 16.

It is pointed out that the frame structure 14 has a plurality of spindles 17 projecting laterally out from opposite sides thereof. While not shown in the drawings, it is pointed out that the spindles 17 are arranged in opposed pairs and revolvably support thereon a plurality of rolls or spools each having elongate strands of glass fiber R wound thereon.

Extending between and rigidly connected to the vertical supports 15 and 16 is a horizontally disposed frame element 18. A substantially horizontally disposed housing 19 is rigidly affixed at its rearmost end to the vertical support 16 and is supported at its forward end by a bracket 20, the latter being rigidly secured to the frame element 18 and depending therefrom. This housing 19 suitably houses an elongate chain 21 which is trained around sprockets disposed within the housing and which has one end secured to rear end of an elongated, substantially cylindrical support or mandrel 22. Although not shown, means are provided for winding the chain 21 about the sprockets upon which it is trained to retract the chain into the housing and to also retract or move the mandrel 22 rearwardly from the position illustrated in FIG. 1. It is pointed out that the mandrel will normally be disposed in the position indicated in FIG. 1 during the pipe-forming operation but through the use of the chain 21 the mandrel 22 can be axially retracted and extended for the purposes of maintenance, inspection and the like. It is also pointed out that the mandrel 22 may be axially retracted into the housing 19. The means for axially shifting the mandrel 22 may be a hand crank drivingly connected to one of the sprockets around which the chain 21 is trained.

As pointed out above, the mandrel or cylindrical support 22 is normally disposed in the position illustrated in FIG. 1 during the pipe-forming operation and it will be seen that mandrel 22 extends through a resin coating chamber or tank 23 which contains a supply of a liquid, preferably thermosetting resin.

It will be noted that the resin coating chamber 23 is rigidly secured to a plate 24 by means of a bracket 25, the upper end portion of plate 24 being rigidly secured to the frame element 18 and the lower portion of the plate being secured to frame element 26 which actually constitutes an extension of the frame member 12.

The rear end wall of the resin coating chamber structure 23 has an inlet tube 27 communicating with the interior thereof and it will be seen that the mandrel 22 projects through this inlet tube 27 and through the interior of the resin coating chamber structure 23 as best seen in FIG. 3.

It will also be noted that a plurality of elongate strands of flexible fibers extend from the rearmost rolls R and through the inlet tube 27. Although the strands or fibers R may be formed of any material having the desirable physical properties, it is preferred that the fibers be of glass fiber construction and it is pointed out that the inlet tube 27 is of a size to very snugly accommodate a plurality of such fibers and the mandrel. This snug-fitting relation of the inlet tube 27 with respect to the mandrel and fibers prevents the liquid resin from flowing through and out of the tube 27.

When a plurality of fibers are pulled through a resin coating chamber structure 23, these fibers will be completely coated by the liquid thermosetting resin therein and will be positioned in axially extending relation upon the mandrel 22. To this end, the forward wall of the resin coating chamber structure 23 is provided with an outlet tube 28 which cooperates with the inlet tube 27 and the resin coating chamber 23 to arrange the fibers axially of the support or mandrel 22 to thereby form an inner tubular-shaped lamina IL as best seen in FIG. 11. It is also pointed out that the outlet tube 28 also serves to slightly compress the fibers which comprise the inner lamina IL and to remove the excess resin from these fibers.

As the inner lamina IL is formed and pulled along the mandrel 22, a winding mechanism, designated generally by the reference numeral 29, simultaneously winds a plurality of strands into a tight helix around this inner lamina IL to form an intermediate lamina ML. This winding mechanism 29 includes a relatively large pulley 30 provided with a hub 31 which is revolvably mounted upon a bearing (not shown) carried by the plate 24. Thus the pulley 30 and the hub 31 are mounted for rotation relative to the plate 24 and it will be seen that the pulley 30 is provided with a V-shaped annular groove 30a for suitably accommodating an endless drive belt 32 which is trained around a drive pulley (not shown) of a suitable drive means such as an electric motor. Therefore, when the drive means for the winding mechanism is energized, the pulley 30 will be revolved to wind the elongate fibers into a tight helix around the inner lamina IL and to thereby form the intermediate lamina.

The front face of the pulley is provided with a plurality of axially projecting, radially spaced lugs 33 each of which is provided with a spindle 34. It will be noted that the spindle 34 accommodates rolls or spools S upon which elongate, preferably glass fibers are wound as best seen in FIGS. 3 and 5. It will also be noted that the front face of the pulley 30 is provided with a plurality of fiber guide elements 35 each of which cooperates with one of the spools of fibers to permit an elongate strand or fiber to be trained therethrough. The winding mechanism 29 also includes a winding member 36 which is affixed to the front face of the pulley 30 and which projects axially therefrom. It will be noted that this winding member 36 is disposed in substantially coaxial relation with respect to the mandrel 22 and is revolvable with the pulley 30. This winding member 36 is provided with a plurality of circumferentially spaced axially projecting winding fingers 37 which serve to helically wind the glass fiber strands upon the inner lamina IL when the winding mechanism 29 is revolved. The helically wound fibers applied by the winding mechanism 29 define an intermediate lamina ML.

It is pointed out that the inner lamina IL will be sufficiently coated with resin to at least provide a portion of the binder or resin needed to suitably bind the tight helically wound fibers comprising this intermediate lamina ML. Although it will be discussed in more detail hereinbelow, it is pointed out that laminated fiber reinforced plastic pipe structure being formed upon the mandrel 22 will be continuously moved axially along the mandrel during formation of this laminated pipe structure.

Referring again to FIGS. 1 and 3, it will be seen that a second resin-coating chamber structure 38 is spaced in closed proximity to but forwardly of the winding mechanism 29. It will also be noted that the side walls of the resin-coating chamber structure 38 project upwardly and are secured to the vertical support element 15. A plurality of upper guide elements 39 are affixed to the opposite side walls of the resin coating chamber structure 38 and these upper guide elements on each of the side walls are arranged in longitudinal alignment and serve to guide the elongate strands of glass fiber being unwound from the forwardmost spools R carried by the frame structure 14.

Cooperating with the upper guide elements 39 on each side of the resin coating chamber structure 38 are a plurality of lower guide rollers 40, the latter being arranged in vertically staggered relation as best seen in FIG. 1. It will be noted that each upper guide element 39 on each side of the resin-coating structure 38 is arranged in paired relation with one of the lower guide rollers 40.

Positioned closely adjacent the rear wall of the resin coating chamber structure 38 is a pair of laterally spaced apart, relatively large vertical guide rollers 41 as best seen in FIGS. 3 and 6. It will be noted that each of these guide rollers 41 are mounted for rotation about vertically disposed pins or axles 42. Each of the guide rollers 41 is provided with a plurality of vertically spaced apart annular grooves 43, each of these grooves being disposed in alignment with one of the lower guide rollers 40 and cooperating therewith for guiding the elongate fibers from one side of the resin-coating chamber into the chamber through the rear wall thereof.

To this end, it will be noted that the rear wall of the resin-coating chamber structure 38 is provided with a plurality of vertically spaced apertures 44 as best seen in FIG. 6. It will be noted that these vertically spaced apart apertures 44 are arranged into a pair of vertically disposed rows each aperture serving to receive an elongate fiber from one of the annular grooves 43 of the guide rollers 41. Thus it will be seen that a plurality of elongate, preferably glass fibers are pulled through the resin-coating chamber structure 38 on opposite sides of the mandrel 22.

Means are provided for aligning the fibers extending through the apertures 44 and into the resin-coating chamber structure 38 axially upon the intermediate lamina ML. This fiber-aligning means includes a guide plate 45 which is positioned within the resin-coating chamber structure 38. It will be noted that this guide plate 45 is provided with an opening through which the mandrel extends and is also provided with a plurality of apertures. These apertures 45a are arranged in a circular pattern disposed closely adjacent the mandrel 22. Therefore, as the inner and intermediate laminae of the tubular pipe structure being formed are pulled axially along the mandrel and through the resin coating chamber structure 38 the elongate fibers passed into the chamber structure 38 through the apertures 44 will be coated with a resin and will be disposed in axially extending relation upon the intermediate lamina ML to define a tubular shaped outer lamina OL as best seen in FIG. 11. The excess resin will be removed from the outer lamina OL as the tubular laminated pipe structure passes through the outlet opening of the resin-coating chamber structure 38. This outlet opening 38a also slightly compresses the laminated tubular structure as the tubular structure passes through the outlet.

After the outer lamina is formed upon the intermediate lamina and while the tubular laminated structure is being moved along the mandrel 22, means are provided for applying a flexible tubular mold to the exterior of this axially moving laminated tubular structure go give the exterior surface thereof a smooth, even finish. This flexible tubular mold applying means includes a transversely extending support bar 50 which is secured to the elongate frame member 12 and projects laterally from opposite sides thereof. A pair of upstanding pins 51 are secured to opposite ends of bar 50 and these pins 51 each have journaled thereon a roll 52 of an elongate adhesive mold-forming strip such as cellophane tape or the like. These mold-forming cellophane strips M are of a width so that when these strips are longitudinally applied to the exterior of the axially moving tubular shaped laminated structures, these strips will overlap each other to completely enclose the tubular structure.

Means are provided for shaping and forming the flexible mold-forming strips M arcuately of their width and for applying these strips to the exterior of the laminated tubular structure as the latter moves along the mandrel 22. This means for shaping the cellophane strips M includes a pair of former mechanisms 53 which are longitudinally spaced along the elongate frame member 12. These former mechanisms 53 are of substantially identical construction and each includes a U-shaped member 54, the bight portion of which is affixed to the upper surface of the elongate frame member 12. A former arm 55 is pivotally connected to the bight portion of U-shaped member 54 by a pivot pin 56 and an arcuate former element 57 is carried by the upper end of the arm 55. It will be noted that the former element of each former mechanism is of substantially semi-circular shape and cooperates with the forming strip M from one of the rolls 52 to arcuately shape nad apply the strip to the exterior surface of the axially moving laminated tubular structure as the latter moves along the mandrel 22. It will be noted that the upper portions of the legs of the U-shaped member 54 are provided with threaded apertures and threadedly engaged in these apertures are a pair of positioning elements 58 which engage the former arm 55 and positions the same with respect to the mandrel 22.

Thus it will be seen that the former mechanisms 53 cooperate with each other and with their respective rolls and mold forming strips M to shape the latter into a tubular shaped mold to completely enclose the axially moving laminated tubular structure as the latter moves along the mandrel.

Means are provided for sealing the overlapped edges of the mold-forming strips M to form these strips into a sealed tubular mold. This heat sealing mechanism, designated generally by the reference numeral 59, includes a support base 60 affixed to the upper surface of the elongate frame member 12. This support base 60 has a pair of arms 61 affixed thereto in upstanding relation therewith. A pair of heating support blocks 62 are mounted for shifting movement along the support base 60 and each of these support blocks 62 has an arcuate shaped heating element 63 secured thereto.

It will be noted that the heating elements 63 when disposed in abutting relation define a cylindrical heating structure for accommodating the flexible mold and enclosed laminated tubular structure as best seen in FIG. 10. The heating elements 63 may be suitably heated by electrical heating elements to provide sufficient heat to cause the overlapped edges of the mold forming strips M to melt into heat-sealed relation so that the flexible tubular mold completely and sealingly encloses a laminated tubular structure. Threaded apertures in each of the arms 61 are threadedly engaged by threaded positioning element 64 and these positioning elements serve to maintain the support blocks 62 in a position to dispose the respective heating elements thereof into abutting relation. It will therefore be seen that the heat sealing mechanism 59 serves to seal the tubular flexible mold around the exterior surface of the laminated tubular structure.

It is pointed out that the cylindrical mandrel 22 is provided with a suitable heating element 22a located interiorly and throughout substantially the length thereof. This heating element is connected by suitable electrical conductors to a source of electrical current. Since the mandrel 22 is constructed preferably of a suitable metallic material, energization of the heating element 22a therein will serve to quickly heat the mandrel to a predetermined temperature. Thus, it will be seen that curing of the resin of the inner lamina IL begins as soon as the inner lamina IL is applied to the mandrel 22 and continues as this inner lamina is moved along the mandrel. The mandrel will be heated to a predetermined temperature and this temperature may be selectively varied up to 500 degrees F.

The rate of speed that the laminated tubular structure is moved axially along the mandrel depends upon the rate of curing of the particular resin used, and the length of the mandrel. It is pointed out, however, that the fiber reinforced laminated tubular structure will be moved along the mandrel until the resin of the innermost lamina is at least partially cured and is thereby dimensionally stable.

It will be seen that after the flexible tubular mold is applied to the exterior surface of the axially moving laminated tubular structure the tubular structure is then passed through a heating zone which is in the form of an elongate heating tube 70. Application of heat to the laminated tubular structure accelerates curing the resin therein.

It will be noted that the tubular heating structure 70 is supported above the elongate frame member 12 by suitable brackets 71. It is also pointed out that while the heating tubular structure 70 is heated by steam any suitable medium may be employed such as heating lamps or the like. It will also be noted that the mandrel when in the operative position extends into the interior of the tubular heating structure 70 so that the laminated tubular pipe structure being formed on the mandrel is simultaneously heated both exteriorly and interiorly.

As pointed out above, the resin of the innermost lamina IL will be heated by the mandrel until the inner lamina is at least dimensionally stable before this laminated tubular pipe structure is moved axially from the mandrel. Thereafter, the complete curing of the laminated tubular structure is accelerated by passing the laminated tubular structure through the heating structure 70 whereby the finished fiber-reinforced plastic pipe product emerges from the heating tube 70.

Means are provided for removing the tubular flexible mold from the finished pipe structure and this means includes a pair of stripper rollers 72 positioned on opposite sides of the discharge end of the heating tube 70, although only one such stripper roller is shown in FIG. 2. Each of these stripper rollers 72 is mounted for rotation with a substantially vertical axle 73, as best seen in FIG. 2, and these stripper rollers 72 are revolved at a speed to cause the mold forming strips M to be removed from the exterior of the finished pipe structure and to be rewound on the rollers. Suitable drive means are provided for revolving the axles 73 and this drive means may be in the form of an electric motor or the like.

The means for causing continuous axial movement of the laminated fiber-reinforced plastic pipe structure during formation thereof includes a puller mechanism 75 which is located adjacent the forward end of the elongate frame member 12. This pipe-pulling mechanism 75 includes a pair of elongate support bars 76 which are pivotally mounted at their respective forwardmost ends to a bracket 78 by pivot pins 77, bracket 78 being rigidly secured to a rectangular frame member 12.

These pivot pins 77 permit the elongate support bars 76 to swing towards and away from each other about a substantially vertical axis. Each of the pivot support bars 76 has a plurality of pulleys 79 revolvably mounted thereon, each pulley being secured to its associated pivot support bar 76 by a pin or axle 80. Trained around the pulleys 79 on each of the support pivot bars 76 is an endless belt 81 preferably formed of a compressible material such as rubber or the like. Suitable drive means are provided for driving the pulleys 79 on each of the pivot bars 76, so that the belt 81 is moving forwardly.

This drive means includes a pair of gears 79a each affixed to the forwardmost pulley axle 80 on each pivot support bar 76. A pair of enmeshing gears 82 are disposed forwardly of the gears 79a and are revolvable about a vertical axis. Gears 82 are affixed to pins 82a, the latter being journaled in suitable bearings. Each of the gears 82 is disposed in enmeshing relation with one of the gears 79a. Thus, when gears 82 are revolved, gears 79a will be similarly revolved. One of the gears 82, as best seen in FIG. 7, is disposed in enmeshing relation with a small annular gear 83, the latter being keyed to a vertical shaft 83a. Shaft 83a is journaled for rotation about its longitudinal axis and a gear 83b is affixed to the lower end of shaft 83a for rotation therewith. A worm gear 83c is affixed to a drive shaft 83d, the latter comprising the drive shaft of a suitable motor. The worm gear 83c is disposed in enmeshing relation with gear 83b and serves to drive the same. Therefore, when shaft 83a is driven, the belts 81 will be driven thereby pulling the pipe structure axially of the mandrel.

Thus, when the belts are disposed in substantially abutting relation, the pipe gripped therebetween will be pulled therealong.

In order to insure positive even drive of the belts 81, the respective front and rear pulley axles 80 of each support bar 76 are provided at their lowermost ends with sprockets 80a as best seen in FIG. 8. A pair of endless chains 80b are each trained around the sprocket 80a associated with each of the belts 81 and this drive transmitting means permits even and effective driving of the belts.

The means for shifting the pivot support bar 76 between open and closed positions includes an elongate lever 85 which is pivotally mounted to the support frame as at 86. A pair of small links 87 are pivotally connected respectively to the actuating lever 85 by means of pivot pins 88. Each of these links 87 is also connected to one of the pivot support bars 76 by pivot pins 89.

It will, therefore, be seen that by shifting actuating lever 85, the pivot bars 76 may be pivoted towards and away from each other to release or grip a pipe between respective belts 81. When the belts 81 are disposed in abutting relationship and are driven by the drive means, a pipe engaged therebetween will be pulled axially along and from the mandrel 22.

A control means is provided for automatically stopping operation of the pipe pulling mechanism 75 in the event axial movement of the laminated pipe ceases. This control mechanism 90 includes an L-shaped bracket 91 secured to the upper surface of the elongate frame member 12, adjacent the puller mechanism 75. A bifurcated arm 92 is pivotally mounted on the L-shaped bracket 91 by a pivot pin 93 to permit vertical swinging of this bifurcated arm about a substantially horizontal axis. The bifurcated arm carries a relatively larger roller 94 adjacent its forwardmost end, the latter being provided with a suitable pin for revolving movement about a substantially horizontal axis. A pipe supporting roller 95 is positioned below the roller 94 and serves to rollably support the pipe as the latter is moved thereover.

A vertically disposed coil spring 96 has its lowermost end bearing against the bifurcated arm 92 and has its upper end bearing against a bearing block 97, the block being secured to the L-shaped bracket 91. This spring 96 serves to urge the bifurcated arm downwardly about its pivot support 93 and into engagement with the pipe being pulled.

An L-shaped bifurcated arm 98 is pivoted to the L-shaped bracket 91 by a pivot pin 99 to permit vertical swinging of the L-shaped arm about a substantially horizontally disposed transverse axis. This L-shaped bifurcated arm 98 carries a roller 100, the roller being secured to the bifurcation of the arm 98 by an axle 101. This axle 101 is connected to a suitable drive means so that the roller 100 will be driven in a counter clockwise direction as viewed in FIG. 8. Disposed above the bifurcated arm 98 in an obstructing relation thereto is a switch 102. The switch 102 is arranged in controlling relation with the circuit which energizes the electric motor that drives the puller mechanism 75. Therefore, when the arm 98 is moved upwardly to engage the switch arm of switch 102, a circuit to the drive means for the puller mechanism 75 will be opened and the puller mechanism 75 will be instantly stopped. Switch 102 is also disposed in controlling relation with respect to the circuit which actuates the drive means for the winding mechanism 29. Therefore, when the switch 102 is opened then the circuit to the winding mechanism drive means will also be opened and this will cause instant stoppage of the winding mechanism. A pair of positioning elements 103 in the form of threaded bolts threadedly engage threaded lugs affixed to the bracket 91. Adjustment of these threaded positioning elements 103 allows the amount of movement of the arm 98 to be variously adjusted when actuating the switch 102.

The roller 94 will be urged against the pipe as the latter is pulled by the pipe pulling mechanism 75 and it will be noted that this roller is of a size substantially larger than the roller 100. Since the roller 94 engages the pipe, and since the pipe is being moved by the pipe pulling mechanism 75, the roller 94 will be moved in a counter clockwise direction as viewed in FIG. 8. The spring 96 will constantly urge the arm 92 downwardly and the roller 94 will be maintained in engagement with the pipe. The roller 100 will be driven by the power means which is operatively secured to the axle 101 thereof at a speed substantially equal to or preferably slightly slower than the speed of the roller 94. Therefore, the roller 100 being engaged by the roller 94 will be maintained in substantially the position illustrated in FIG. 8. When the axial movement of the laminated pipe structure ceases or the speed of movement thereof is slowed substantially, then the roller 94 will also be stopped or revolved very slowly. When the roller 94 is stopped or slowed considerably, then the roller 100 will climb upwardly on the roller 94 thus moving the arm 98 upwardly to engage and actuate the switch 102 and thereby instantly stop operation of the puller mechanism 75 and winding mechanism 29. With this arrangement, malfunctioning and subsequent jam-up of the continuously moving laminated tubular structure will be averted. Actually the circuits to all of the drive means for the various mechanisms will be opened when switch 102 is actuated.

OPERATION

During operation of the apparatus in carrying out the novel process, the various switches and controls are actuated on the control panel 110. It will be noted that there is a switch 111 for controlling the circuit to the heating element in the mandrel 22 and this switch will be closed to cause heating of the mandrel.

Another switch 112 actuates the circuit for energizing the drive for the winder mechanism 29. Switch 113 controls the circuit for the drive means for revolving the shaft 101 of the sensing control mechanism 90. A switch 114 is provided for energizing the circuit controlling the drive means for revolving shaft 83d of the puller mechanism 75. A switch 115 is provided for energizing the circuit to the drive means for the stripper rollers 72. The control panel 110 is also provided with a master switch 116 which must be closed before any of the various mechanisms can be operated. However, if it is desirable to preheat the mandrel only the master switch 116 and switch 111 will be closed while the remaining switches will be left open.

In order to begin operations, it will be necessary to pull the strands or fibers from the rearmost rolls R through tank or resin coating chamber structure 23 along the mandrel and to completely pull these strands through the pulling mechanism 75. Similarly, it will also be necessary to unwind and pull the strands from the spools mounted on the winder mechanism 29 and to pull these strands also along the mandrel until these strands are engaged by the puller mechanism. The strands from the forwardmost rolls R also will be pulled around the vertical guide rollers 41 through the apertures 44 and the apertures in the guide plate 45 through the resin coating chamber structure 38 along the mandrel through the heating tubes until these fibers are also pulled and engaged by the pulling mechanism 75.

Thereafter, when the apparatus is energized to begin operation of the laminated pipe making process, the fibers from the rearmost rolls or spools R will pass through the resin coating chamber 23 and will be completely covered with the thermo-setting resins therein. These fibers will be peripherally positioned around the mandrel 22 to extend axially thereto by the outlet fiber-arranging tube 28 which cooperates with the resin coating chamber structure 23 to form these fibers into a tubular-shaped inner lamina IL.

Thereafter, the winding mechanism 29 will unwind the fibers from the spools carried on the spindles 34 and wind these fibers upon the inner lamina IL to form a helically wound intermediate lamina ML. It will be noted, as pointed out above, there will be sufficient resin remaining on the fibers of the inner lamina IL to suitably bind the tight helically wound fibers of this intermediate lamina ML.

As this inner lamina IL is formed, it will be moved axially along the mandrel 22 and the intermediate lamina ML will be moved with the inner lamina. It will be seen that these two laminae will be passed into and through the resin coating chamber structure 38 wherein another set of elongate fibers will be unwound from the forwardmost spools R and will be coated with the resin and positioned in axially extending relation upon the intermediate tubular shaped lamina M1 to form the outer lamina OL.

It will be noted that the fibers comprising the outer lamina OL will be positioned in axially extending relation upon the intermediate tubular shaped lamina by the apertured guide plate 45 and the excess resins will be removed from these outer lamina OL by the outlet opening of the chamber structure 38 as the tubular laminated structure passes through this outlet.

The stripper roller 72 will pull the elongate strips of flexible cellophane from their respective rolls and the former mechanisms 53 arcuately shape and apply these strips to the exterior surfaces of the laminated pipe structure being formed. As the arcuately shaped overlapping strips are passed through the heat sealing mechanism 59, the strips will be sealed into a flexible tubular shaped mold to completely enclose the laminated pipe structure being formed and through use of such a flexible tubular mold, the exterior surface of the pipe thus formed will be very smoothly finished.

As the laminated tubular structure is pulled along the mandrel, the heated mandrel will cause the resin of the innermost lamina to begin curing so that the resin of this innermost lamina will be at least partially cured and be dimensionally stable as this tubular pipe structure is pulled from the mandrel. Passage of the tubular pipe structure through the tubular heating structure causes rapid curing of this laminated structure so that the laminated tubular structure will be completely cured as it emerges from the discharge end of the tubular heating structure.

It will be seen that the stripper rollers 72 will remove the cellophane strips from the finished laminated pipe structure as the pipe structure passes through the discharge end of the heating tube 70 and the puller mechanism 75 causes continuous movement of the laminated pipe as the latter is being formed.

A suitable cutting mechanism may be provided (although not shown) for cutting the pipe thus formed into predetermined lengths. Such a cutter mechanism may be constructed for automatic operation and may be adjustable to vary the lengths of the pipe to be cut.

The following examples are illustrations of the material which may be used in forming and producing fiber-reinforced laminated plastic pipe structures according to my novel process. It is to be understood, however, that the invention is by no means limited to the specific materials described in the following.

*Example I*

A liquid polyester resin is used as the binder and each of the resin-coating chamber structures 23 and 38 will contain supply of this liquid polyester resin.

The fibers or strands are formed of glass fiber and are of continuous filaments. Each of the strands or fibers are formed of a plurality of a continuous filament and the diameter sizes of each of the filaments will vary and the size will be dependent upon the physical properties which are desirable in the laminated pipe being formed.

The length of mandrel 22 used in forming the tubular pipe was approximately sixty-eight (68) inches and this mandrel was heated to approximately 250 degrees F. The laminated, glass fiber reinforced, polyester pipe structure was moved axially along the mandrel 22 at the rate of twenty-six (26) inches per minute.

*Example II*

In another example, the thermosetting resin was an epoxy resin and each of the resin coating chamber structures 23 and 38 contained supply of this epoxy resin. The fibers employed in the example were also glass fiber wherein each of the fibers was formed of continuous filaments in the manner of the first example.

Conduits or pipes formed of fiber-reinforced plastic materials are corrosion resistant and may be advantageously employed to permit corrosive type chemicals to flow therethrough. It is also pointed out that the tensile strength of the better grades of glass fiber are greater than steel fibers of comparable size. Through the use of the pipe formed by my novel method, the tensile strength as well as the compression strength of the pipe thus formed will be greater than any comparable fiber-reinforced plastic pipe now being formed.

As pointed out above, many prior art attempts to form fiber-reinforced plastic pipes have resulted in a weaving of the fibers of the fiber-reinforced pipe structures which are produced. This interweaving quite often results in a scissors action when such pipe structures are subjected to tension and compression stresses and this scissoring action of the fiber sometimes results in failure or cracking of the pipes.

It is also pointed out that the helically wound fibers which comprise the intermediate lamina give the pipe structure a high hoop strength. It is also pointed out that the modulus of bend of the laminated pipe structures produced in accordance with my novel process and apparatus is greater than any of the other non-metallic pipes that comprise the prior art.

In view of the above, it will be seen that I have provided a novel high capacity process and apparatus capable of continuous production of fiber-reinforced laminated plastic pipe structures.

It will also be seen from the foregoing paragraphs that in carrying out my novel process, the fiber-reinforced laminated pipe structure being formed is continuously moved along a cylindrical heated stationary mandrel until the pipe structure is at least dimensionally stable and is thereafter removed from the mandrel and is rapidly cured thus permitting continuous and rapid production of fiber-reinforced laminated pipe structure.

It will, therefore, be seen that I have provided a novel process and apparatus which while being of simple and inexpensive construction and operation permits economic production of pipe structure having physical strength properties and characteristics not found in any heretofore known comparable laminated pipe structures.

It will, of course, be understood that various changes may be made in the form, details, arrangements and proportions of the various parts without departing from the general scope of my invention.

What is claimed is:

A continuous process for forming fiber reinforced laminated pipe, said process consisting in coating a plurality of elongate fibers with a liquid plastic resin, directly positioning said resin-coated fibers in longitudinally extending, moving side-by-side relationship upon and in contact with the outside surface of a stationary, substantially cylindrical support whereby to effect formation of a first internal tubular shaped lamina, applying heat from the outer surface of said support to the internal surface of said first internal lamina as same is moved along the internal support whereby to tend to effect cure of the resin thereof, substantially simultaneously winding a plurality of elongate fibers into a helix concentrically around said first internal tubular shaped lamina to thereby form a second intermediate tubular shaped lamina, the fibers and resin of said lamina cooperating with one another to define a relatively integrated two-layer laminated tubular structure, moving said relatively integrated laminated tubular structure axially along and with the first internal lamina thereof in direct contact with the outer surface of said support at a predetermined speed, coating another set of elongate fibers with a liquid, thermosetting resin, positioning said last mentioned set of resin coated fibers into longitudinally extending, moving side-by-side relationship upon the outer surface of said intermediate tubular shaped lamina to thereby form a tubular shaped outer lamina thereof, the fibers and resin of the inner, intermediate and outer lamina cooperating with one another to define a relatively integrated three layer laminated tubular shaped structure, moving said laminated tubular structure axially along and in direct contact with the cylindrical support while continuing to apply heat to the internal surface thereof from the external surface of said support at a predetermined speed until the thermosetting resin of the said inner lamina is at least partially cured and thereby dimensionally stable, continuing to apply heat from the said internal support and further applying additional heat from an external lamina heating means concentric thereto while continuing axial motion of the three layer lamina along and in direct contact with said support via said first internal lamina and enclosing within said external heating means the composite structure until the three layer lamina is substantially completely cured and removing the substantially cured three layer lamina from the mandrel and external heating means.

References Cited by the Examiner

UNITED STATES PATENTS

| | | | |
|---|---|---|---|
| 1,932,942 | 10/33 | Thordarson | 156—432 XR |
| 2,723,705 | 11/55 | Collins | 156—179 XR |
| 2,760,549 | 8/56 | Nash et al. | 156—188 XR |
| 2,906,317 | 9/59 | Keyes | 156—190 XR |
| 3,033,729 | 5/62 | Shobert | 156—180 XR |
| 3,068,133 | 12/62 | Cilker et al. | 156—433 XR |
| 3,068,934 | 12/62 | Mauck et al. | 156—425 XR |

EARL M. BERGERT, *Primary Examiner.*